(12) United States Patent
Lee et al.

(10) Patent No.: US 9,899,935 B2
(45) Date of Patent: Feb. 20, 2018

(54) POWER FACTOR CORRECTION DEVICE WITH FIRST AND SECOND OUTPUT PARTS

(71) Applicant: LG Innotek Co., Ltd., Seoul (KR)

(72) Inventors: Jae Sam Lee, Seoul (KR); Dong Young Huh, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/910,812

(22) PCT Filed: Aug. 7, 2014

(86) PCT No.: PCT/KR2014/007339
§ 371 (c)(1),
(2) Date: Feb. 8, 2016

(87) PCT Pub. No.: WO2015/020463
PCT Pub. Date: Feb. 12, 2015

(65) Prior Publication Data
US 2016/0190952 A1    Jun. 30, 2016

(30) Foreign Application Priority Data
Aug. 7, 2013  (KR) .......................... 10-2013-0093854

(51) Int. Cl.
*H02M 1/42* (2007.01)
*H02M 7/06* (2006.01)
(Continued)

(52) U.S. Cl.
CPC ........... *H02M 7/06* (2013.01); *H02M 1/4225* (2013.01); *H02M 3/158* (2013.01);
(Continued)

(58) Field of Classification Search
CPC ... H02M 2001/0077; H02M 2001/009; H02M 1/4225; H02M 3/158; H02M 7/06; H02M 7/2176; Y02B 70/126
See application file for complete search history.

(56) References Cited

U.S. PATENT DOCUMENTS 5,847,949 A  12/1998  Jiang
5,894,214 A   4/1999  Jiang
(Continued)

FOREIGN PATENT DOCUMENTS

CN    1551472 A   12/2004
CN  101170277 A    4/2008
(Continued)

OTHER PUBLICATIONS

International Search Report in International Application No. PCT/KR2014/007339, filed Aug. 7, 2014.
(Continued)

*Primary Examiner* — Fred E Finch, III
(74) *Attorney, Agent, or Firm* — Saliwanchik, Lloyd & Eisenschenk

(57) ABSTRACT

According to one embodiment of the present invention, when a power supply device including first and second amplification units which share an energy storage element is used, it is possible to reduce voltage stress on a semiconductor device and to consistently maintain voltages output to the first and second amplification units by independently adjusting the amplification rates of the first and second amplification units.

20 Claims, 10 Drawing Sheets

(51) Int. Cl.
*H02M 3/158* (2006.01)
*H02M 1/00* (2006.01)

(52) U.S. Cl.
CPC ............... *H02M 2001/009* (2013.01); *H02M 2001/0077* (2013.01); *Y02B 70/126* (2013.01)

(56) References Cited

U.S. PATENT DOCUMENTS

| | | | | |
|---|---|---|---|---|
| 5,982,649 | A * | 11/1999 | Turner | H02M 3/155 363/126 |
| 6,239,584 | B1 | 5/2001 | Jang et al. | |
| 6,950,319 | B2 | 9/2005 | Huber et al. | |
| 8,026,697 | B2 | 9/2011 | Yang | |
| 8,207,717 | B2 | 6/2012 | Uruno et al. | |
| 9,224,530 | B2 | 12/2015 | Kim et al. | |
| 2003/0117209 | A1* | 6/2003 | Tsuchiya | H02M 3/1582 327/530 |
| 2005/0104565 | A1* | 5/2005 | Nagaoka | H02M 3/158 323/222 |
| 2007/0075689 | A1* | 4/2007 | Kinder | H02M 3/1582 323/259 |
| 2009/0085537 | A1 | 4/2009 | Nakabayashi et al. | |
| 2010/0002473 | A1* | 1/2010 | Williams | H02M 3/158 363/21.06 |
| 2010/0164282 | A1* | 7/2010 | Tseng | H02M 3/158 307/31 |
| 2014/0239720 | A1* | 8/2014 | Liu | H02M 3/1582 307/31 |
| 2016/0204694 | A1* | 7/2016 | Kim | H02M 7/155 363/126 |

FOREIGN PATENT DOCUMENTS

| | | | |
|---|---|---|---|
| CN | 102916594 A | 2/2013 | |
| DE | 102013005070 A1 * | 9/2014 | ............ H02M 3/158 |
| EP | 2566026 A1 * | 3/2013 | .......... H02M 3/1582 |
| JP | 200423982 A | 1/2004 | |
| JP | 2004350471 A | 12/2004 | |
| JP | 200573454 A | 3/2005 | |
| JP | 200687257 A | 3/2006 | |
| JP | 4745234 B2 | 8/2011 | |
| KR | 1020130008103 A | 1/2013 | |
| WO | WO 2015164970 A1 * | 11/2015 | ............ H02M 3/158 |

OTHER PUBLICATIONS

Office Action dated Oct. 23, 2017 in Chinese Application No. 201480044997.9, with its English Translation.

* cited by examiner

POWER FACTOR CORRECTION DEVICE WITH FIRST AND SECOND OUTPUT PARTS

CROSS-REFERENCE TO RELATED APPLICATION

This application is the U.S. national stage application of International Patent Application No. PCT/KR2014/007339, filed Aug. 7, 2014, which claims priority to Korean Application No. 10-2013-0093854, filed Aug. 7, 2013, the disclosures of each of which are incorporated herein by reference in their entirety.

TECHNICAL FIELD

The present invention relates to a power supply device.

BACKGROUND

Generally, a capacitor-input type rectifier circuit is widely used as a switching power supply that is used as a power supply for an electronic device. An input current of a pulse type is generated by such a capacitor. Since the pulse-type input current is concurrently generated at each input of an electronic, information, and communication device, the pulse-type input current is added in phase on a distribution line, which results in a harmonic distortion of a power system and the degradation of power factor of a commercial power supply.

To address these problems, research and development is now actively made on a control circuit of a boost-type power factor correction (PFC) having a power factor correction function.

FIG. 1 is a diagram illustrating a conventional power supply device of a boost converter type.

With reference to FIG. 1, a conventional power supply device 1 has a configuration in which an input power source is connected to both ends of a rectifier 2, an inductor 3 is connected between the rectifier 2 and a switching element 4 as an energy storage element, and a diode is connected between the switching element 4 and a capacitor.

The above power supply device 1 amplifies a voltage at an input end to a predetermined ratio to output the amplified voltage to an output terminal 5.

When high voltage such as line-to-line voltage in a three-phase system is applied to the power supply device 1, extremely high voltage is provided to the output terminal 5. Accordingly, voltage stress on a semiconductor device at the output terminal is increased, and thus an insulated gate bipolar transistor (IGBT) element rather than a field effect transistor (FET) element is used as a switching element. Thus, there is a disadvantage in that a low switching frequency should be used according to the use of the IGBT element. Furthermore, there is a design limitation of a power supply device in that a size of a passive element is increased, costs for manufacturing are increased, and so on.

SUMMARY

An embodiment provides a power supply device capable of reducing voltage stress on a semiconductor device included therein.

Another embodiment provides a power supply device capable of constantly controlling output voltages of first and second output units included in the power supply device.

A power supply device according to the embodiment includes an input power supply unit configured to rectify alternating-current (AC) power and an amplification unit configured to amplify an input voltage by n times (n is a real number greater than 1), wherein the amplification unit includes first and second amplification units and an inductor, the first amplification unit outputs a first output voltage corresponding to n1 times (n1 is a positive real number) the input voltage to a first output part depending on an operation of a first switching element, and the second amplification unit outputs a second output voltage corresponding to n2 times (n2 is a positive real number) the input voltage to a second output part depending on an operation of a second switching element.

The first and second amplification units and the inductor of the power supply device according to the embodiment are serially connected, and the inductor is connected between the first and second amplification units.

The first and second amplification units of the power supply device according to the embodiment have the same configuration as each other.

The input power supply unit of the power supply device according to the embodiment includes a rectifier, and the rectifier is a bridge rectifier.

The first amplification unit of the power supply device according to the embodiment includes the first output part connected to the first switching element in parallel, and the second amplification unit includes the second output part connected to the second switching element in parallel.

The first output part of the power supply device according to the embodiment includes a first diode and a first capacitor-resistor which are connected to each other in series, and the second output part includes a second diode and a second capacitor-resistor which are connected to each other in series.

A capacitor and a resistor included in each of the first and second capacitor-resistors of the power supply device according to the embodiment are connected to each other in parallel.

n, n1, and n2 of the power supply device according to the embodiment satisfy Equation 1.

$$n = n1 + n2 \qquad \text{[Equation 1]}$$

n1 and n2 of the power supply device according to the embodiment have the same value as each other.

The first and second switching elements of the power supply device according to the embodiment are simultaneously turned on and simultaneously turned off.

The first and second switching elements of the power supply device according to the embodiment are simultaneously turned on, the first switching element is turned off at a first time point and the second switching element is turned off at a second time point, and when a value of n1 is greater than that of n2, the first time point arrives later than the second time point.

The power supply device according to the embodiment includes a rectifier configured to rectify AC power to a first voltage, and an amplification unit configured to receive and boost the first voltage from the rectifier to divide the boosted voltage into second and third voltages that are output.

The amplification unit of the power supply device according to the embodiment includes a first amplification unit configured to receive and amplify the first voltage to output the second voltage, a second amplification unit configured to be serially connected to the first amplification unit, and to receive and amplify the first voltage to thereby output the third voltage, and an inductor configured to be serially connected to the first and second amplification units.

The inductor of the power supply device according to the embodiment is connected between the first and second amplification units.

The second and third voltages of the power supply device according to the embodiment are the same voltage as each other.

Each of the first and second amplification units of the power supply device according to the embodiment includes first and second switching elements, and the second and third voltages are controlled depending on operating frequencies of the first and second switching elements.

The first and second switching elements of the power supply device according to the embodiment are simultaneously turned on and turned off.

When the second and third voltages of the power supply device according to the embodiment are the same as each other, the first and second switching elements are simultaneously turned on and turned off.

In the power supply device according to the embodiment, during a first period in which the second and third voltages are the same as each other, the first and second switching elements are simultaneously turned on and turned off, and during a second period in which the second and third voltages are different from each other, the first switching element is turned off at a first time point and the second switching element is turned off at a second time point.

During the second period in the power supply device according to the embodiment, the first and second switching elements are simultaneously turned on.

Advantageous Effects

According to the embodiment, voltage stress on a semiconductor device may be reduced by using the power supply device equipped with first and second amplification units which share an energy storage element. Moreover, by independently controlling an amplification ratio of each of the first and second amplification units, output voltages from the first and second amplification portions may be constantly maintained.

BRIEF DESCRIPTION OF THE DRAWINGS

FIG. 4 is a diagram illustrating an operation manner when first and second switching elements Qs and Qm of a power supply device according to a first embodiment of the present invention are turned on.

FIG. 7 is a diagram illustrating an operation manner when the first switching element Qs of the power supply device according to the first embodiment of the present invention is turned off and the second switching element Qm thereof is turned on.

DETAILED DESCRIPTION OF THE EMBODIMENTS

Hereinafter, a power supply device according to an embodiment of the present invention will be described in detail with reference to the accompanying drawings. Exemplary embodiments described herein are provided in order to fully provide the spirit of the invention to those skilled in the art. Therefore, numerous variations and/or modification may be made to the present invention as described in the embodiments without departing from the spirit or scope of the invention.

Figure 1:
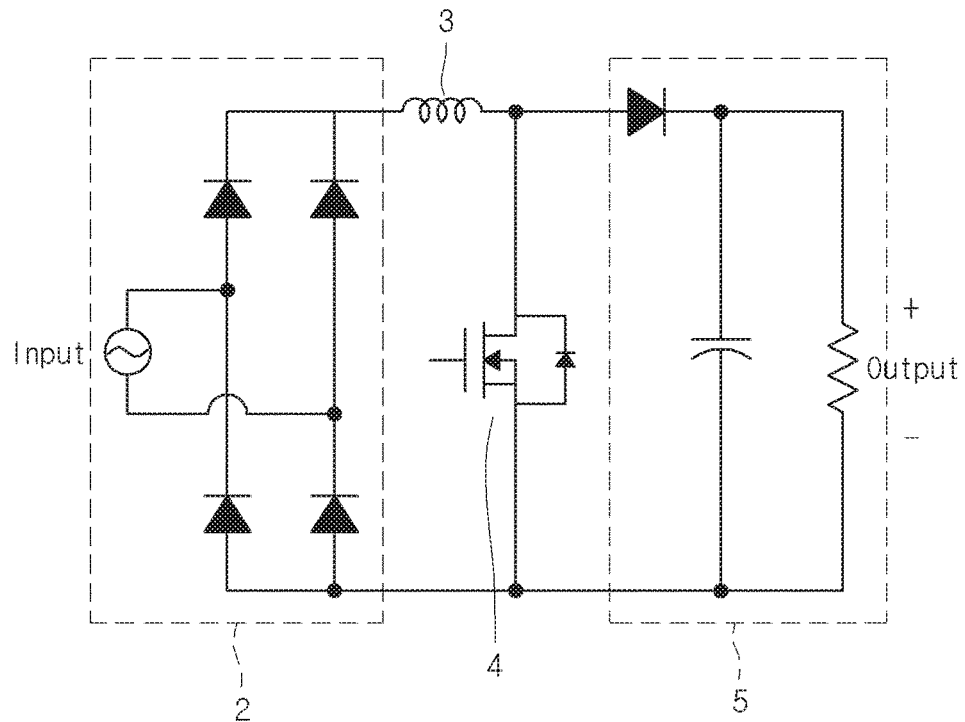
FIG. 1 is a diagram illustrating a conventional power supply device of a boost converter type.
Figure 2:
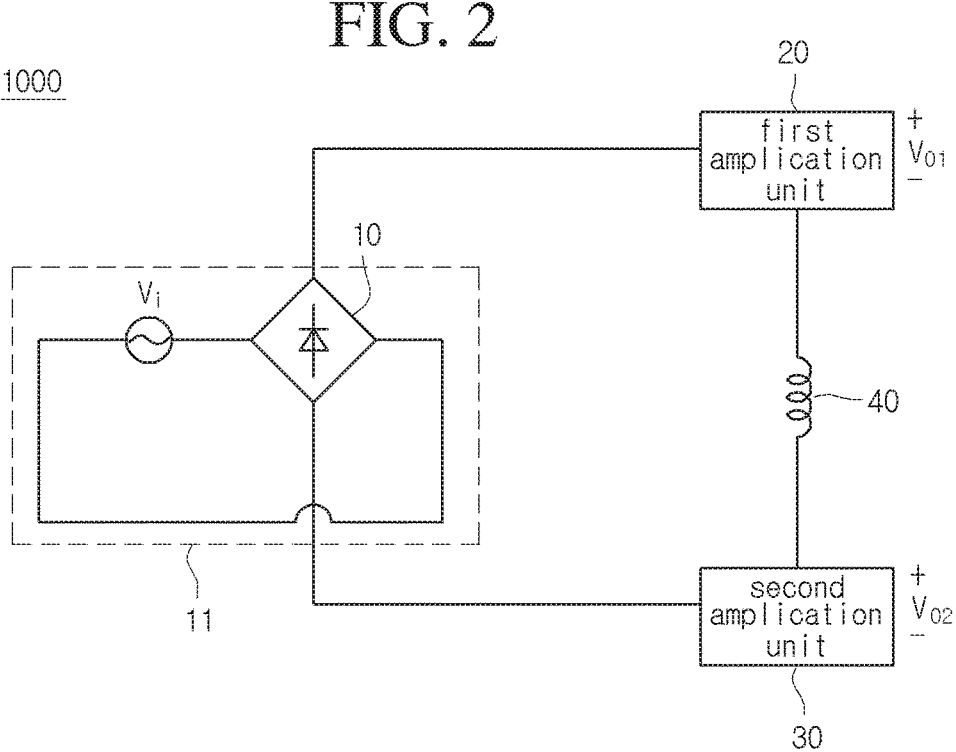
FIG. 2 is a block diagram of a power supply device 1000 according to an embodiment of the present invention.
Figure 3:
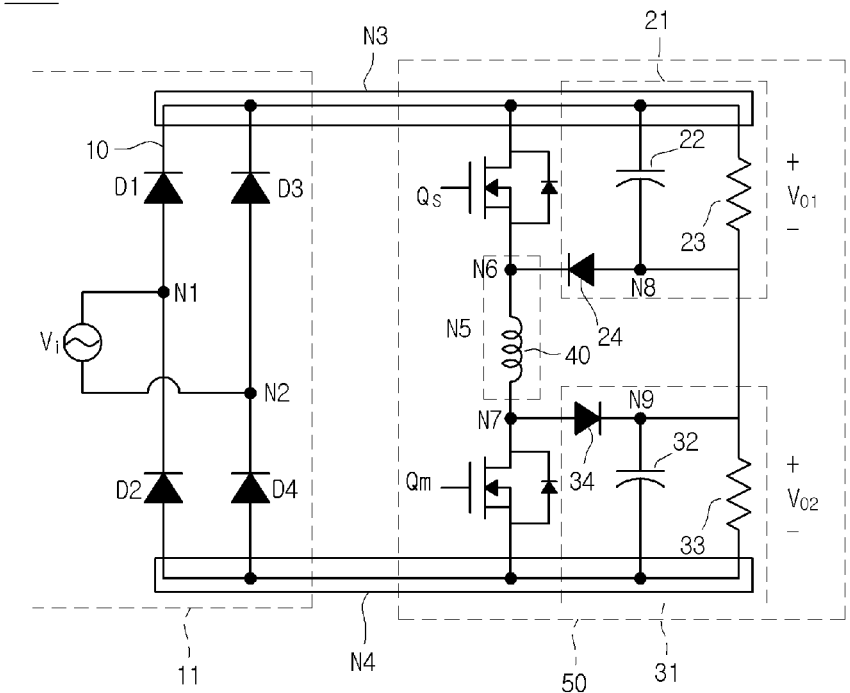
FIG. 3 is a diagram illustrating the power supply device according to the embodiment of the present invention.

FIG. 2 is a block diagram of a power supply device 1000 according to an embodiment of the present invention, and FIG. 3 is a diagram illustrating the power supply device 1000 according to the embodiment of the present invention.

Particularly, the power supply device 1000 according to the embodiment of the present invention may be employed in a system requiring an output voltage higher than an input voltage, that is, for power boosting.

For example, the power supply device 1000 may be used in a battery, a solar panel, a rectifier, and a direct-current (DC) generator, and as a voltage supply device of a light emitting diode (LED) panel or as a device for boosting a gate drive voltage of a liquid crystal display (LCD) panel, but is not limited thereto.

With reference to FIGS. 2 and 3, the power supply device 1000 according to the embodiment of the present invention may include a power source 11 having a rectifier 10, first and second amplification units 20 and 30, and an inductor 40 serving as an energy storage element.

The rectifier 10 receives and rectifies AC power inputted thereto to output the rectified power. The rectifier 10 may be a bridge rectifier and include first to fourth diodes D1 to D4.

The rectifier 100 may receive and rectify the AC power inputted through first and second nodes to output the rectified power through third and fourth nodes.

A connection relationship of the first to fourth diodes D1 to D4 of the rectifier 10 will be described.

An anode is an electrode that is connected to a P-region of each of the first to fourth diodes D1 to D4, and a cathode is an electrode that is connected to an N-region of each diode.

An anode terminal of the first diode D1 is connected to a first node N1, and a cathode terminal thereof is connected to a third node N3.

An anode terminal of the second diode D2 is connected to a fourth node N4, and a cathode terminal thereof is connected to a second node N2.

An anode terminal of the third diode D3 is connected to the second node N2, and a cathode terminal thereof is connected to the third node N3.

An anode terminal of the fourth diode D4 is connected to the fourth node N4, and a cathode terminal thereof is connected to the second node N2.

The inductor 40, which is an energy storage element that is synchronized with operations of the first and second switching elements Qs and Qm, may repeatedly accumulate energy and supply the accumulated energy to the first and second amplification units 20 and 30.

The first and second amplification units 20 and 30 are synchronized with the inductor 40, and may output amplified voltage by amplifying the input voltage.

The first amplification unit 20, the second amplification unit 30, and the inductor 40 may be serially connected. Even though the inductor 40 is arranged between the first and second amplification units 20 and 30 in the drawings, it is not limited thereto.

The inductor 40, the first amplification unit 20, and the second amplification unit 30 may be serially arranged as written. Alternatively, the first amplification unit 20, the second amplification unit 30, and the inductor 40 may be serially arranged as written.

The first and second amplification units 20 and 30 may have a circuit configuration as shown in FIG. 3.

Hereinafter, a fifth node N5 is defined as a SuperNode of a sixth node N6 and a seventh node N7.

The first amplification unit 20 may be connected between the third node N3 and the fifth node N5.

The second amplification unit 30 may be connected between the fifth node N5 and the fourth node N4. Thus, the first and second amplification units 20 and 30 may be connected to each other in series.

The inductor 40 may be connected between the sixth node N6 and the seventh node N7.

It should be noted that a position of the inductor 40 is not limited to the position described above.

The inductor 40 may be connected to the third node N3 between the rectifier 10 and the first amplification unit 20, and may be connected to the fourth node N4 between the rectifier 10 and the second amplification unit 30. Therefore, the rectifier 10, the first and second amplification units 20 and 30, and the inductor 40 may be serially connected.

The first amplification unit 20 may include the first switching element Qs and a first output part 21 that is connected thereto in parallel.

The second amplification unit 30 may include the second switching element Qm and a second output part 31 that is connected thereto in parallel.

The first output part 21 may include a first capacitor 22, a first resistor 23, and a first output diode 24.

The first capacitor 22 and the first resistor 23 may be connected to each other in parallel, and the first output diode 24 may be serially connected to them.

Even though the first output diode 24 is connected between the fifth node N5 and an eighth node N8 in the drawings, it is not limited thereto, and the first output diode 24 may be connected to the third node N3 in a forward direction between the first switching element Qs and the first capacitor 22.

The second output part 31 may include a second capacitor 32, a second resistor 33, and a second output diode 34.

The second capacitor 32 and the second resistor 33 may be connected to each other in parallel, and the second output diode 34 may be serially connected to them.

Even though the second output diode 34 is connected between the fifth node N5 and a ninth node N9 in the drawings, it is not limited thereto.

The second output diode 34 may be connected to the fourth node N4 in a forward direction between the second switching element Qm and the second capacitor 32.

Meanwhile, the first and second capacitors 22 and 32 may stabilize currents supplied to the first and second resistors 23 and 33, and the first and second output diodes 24 and 34 may serve a function of a rectifier diode to prevent a reverse current flow.

The first and second switching elements Qs and Qm serve to control the current supplied from the inductor 40 to the first and second output parts 21 and 31.

That is, the first and second switching elements Qs and Qm are repeatedly turned on and off in response to a pulse width modulation (PWM) signal, so that a magnitude of the current that is supplied from the inductor 40 to the first and second output parts 21 and 31 may be controlled.

In the drawings, the first and second switching elements Qs and Qm are depicted as a power metal oxide semiconductor field effect transistor (MOSFET) for convenience of illustration, but they are not limited thereto. Accordingly, the first and second switching elements Qs and Qm may be an ON/OFF controllable element depending on power capacity.

The power supply device 1000 may receive an input voltage and generate a first output voltage $V_{o1}$ at the first output part 21 depending on an operation of the first switching element Qs. Further, the power supply device 1000 may generate a second output voltage $V_{o2}$ at the second output part 31 depending on an operation of the second switching element Qm.

That is, the first and second amplification units 20 and 30 may amplify the input voltage from the input power source 11 by as much as "n" times.

Unlike a buck converter of which an output voltage is lower than an input voltage, the output voltage of the power supply device 1000 according to the embodiment may be greater than the input voltage. Thus, "n" may be a real number greater than 1. Additionally, a voltage transfer ratio as Equation 1 may be obtained.

$$G_v = \frac{V_o}{V_i} = \frac{1}{1-D} \quad \text{[Equation 1]}$$

In Equation 1, $V_i$ represents an input voltage and $V_o$ represents an output voltage of an amplifier 50.

The relationship of the voltage transfer ratio $G_v$ and a duty ratio D is in inverse proportion to 1−D.

When the duty ratio D is 0, the voltage transfer ratio $G_v$ is 1 as a minimum value, and when the duty ratio D is 1, it has an infinite maximum value.

In case of an ideal element, an output voltage of the amplifier 50 may be controlled by varying the duty ratio D from zero to 1.

The first amplification unit 20 may output the first output voltage $V_{o1}$ corresponding to n1 times the input voltage to the first output part 21. Additionally, the second amplification unit 30 may output the second output voltage $V_{o2}$ corresponding to n2 times the input voltage to the second output part 31.

An amplification ratio of the first amplification unit 20 may be controlled depending on the switching frequency of the first switching element Qs, and an amplification ratio of the second amplifying unit 20 may be controlled depending on an operation of the second switching element Qm.

The relationship of an amplification ratio of the amplifier 50 and amplification ratios of the first and second amplification units 20 and 30 constituting the amplifier 50 may be expressed as Equation 2.

$$n = n1 + n2 \qquad \text{[Equation 2]}$$

That is, the amplifier 50 may amplify the input voltage by as much as n times. As such, an amplified voltage is the same as the sum of the input voltages, which are respectively amplified by n1 times by the first amplification unit 20 and amplified by n2 times by the second amplification unit 30.

n1 and n2 may have the same value, or values different from each other.

When n1 and n2 have the same value, an amplification degree of an input voltage is the same at each of the first and second amplification units 20 and 30. Therefore, it is possible to obtain an identical output voltage from each of the first and second output parts 21 and 31.

When n1 and n2 have values different from each other, an amplification degree of an input voltage is different at each of the first and second amplification units 20 and 30. Therefore, a different output voltage may be obtained from each of the first and second output parts 21 and 31.

Hereinafter, with reference to FIGS. 4 to 7, an operation manner of the power supply device 1000 according to a first embodiment of the present invention will be described. For convenience of explanation, it will be assumed and described that each element has a property close to an ideal characteristic thereof.

Depending on operation manners of the first and second switching elements Qs and Qm, there may be four different operational modes such as a first operational mode to a fourth operational mode.

Output voltages of the first and second output parts 21 and 31 may be controlled through ON/OFF operations of the first and second switching elements Qs and Qm.

(First Operational Mode)

Figure 4:
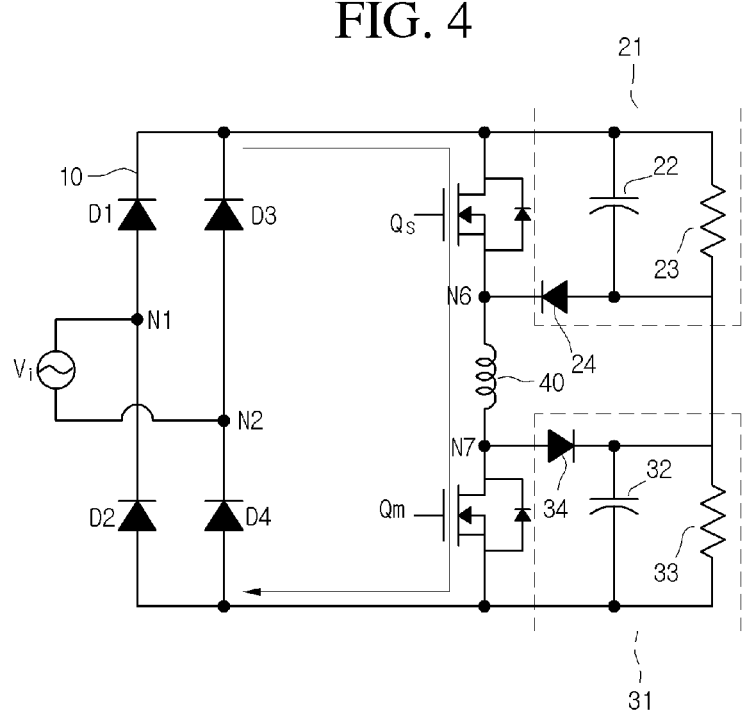

FIG. 4 is a diagram illustrating an operation manner when the first and second switching elements Qs and Qm of the power supply device 1000 according to the first embodiment of the present invention are turned on.

With reference to FIG. 4, in the first operational mode, the first and second switching elements Qs and Qm are simultaneously turned on. In this case, a voltage applied to the first and second switching elements Qs and Qm may be zero volts. Additionally, a current flowing in each of the first and second switching elements Qs and Qm may be a current flowing in the inductor 40.

A rectified input voltage is applied to the inductor 40, and then the current flowing in the inductor 40 is increased.

(Second Operational Mode)

Figure 5:
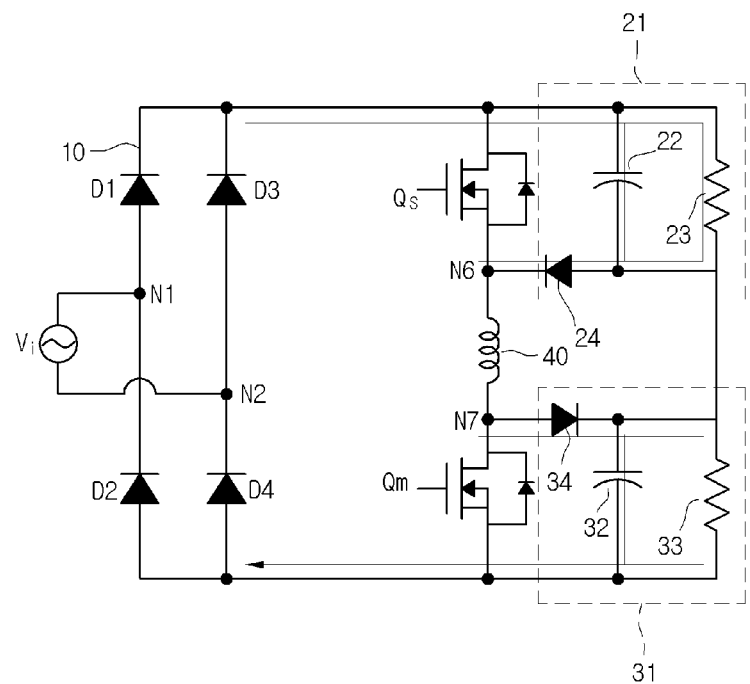
FIG. 5 is a diagram illustrating an operation manner when the first and second switching elements Qs and Qm of the power supply device according to the first embodiment of the present invention are turned off.

FIG. 5 is a diagram illustrating an operation manner when the first and second switching elements Qs and Qm of the power supply device 1000 according to the first embodiment of the present invention are turned off.

With reference to FIG. 5, in the second operational mode, the first and second switching elements Qs and Qm are simultaneously turned off. In this case, the input voltage is divided to be distributed to the first and second switching elements Qs and Qm. Additionally, a current flowing in each of the first and second switching elements Qs and Qm becomes zero amperes (A).

Since the first and second output diodes 24 and 34 are in ON, a voltage being applied thereto becomes zero volts. Additionally, a current flowing in each of the first and second output diodes 24 and 34 becomes a current flowing in the inductor 40.

A voltage applied to the inductor 40 is obtained by subtracting a voltage of each of the first and second output parts 21 and 31 from the input voltage, so that a negative voltage is applied to the inductor 40. Therefore, the current flowing in the inductor 40 is decreased.

Hereinafter, an alternation of the first and second operational modes will be described.

In the first operational mode, the current flowing on the inductor 40 is increased. At this time, when the power supply device 1000 is switched to the second operational mode, a voltage across both ends of the inductor 40 is increased in order to maintain the current flowing in the inductor 40. Additionally, the current flows in each of the first and second output parts 21 and 31. Additionally, when the operational mode is switched to the first operational mode while the current flowing on the inductor 40 is gradually decreased, the first and second switching elements Qs and Qm are turned on to increase the current flowing in the inductor 40.

As described above, when the first and second switching elements Qs and Qm are simultaneously turned on and off to cause a repetition of the first and second operational modes, ON/OFF ratios of the first and second switching elements Qs and Qm are determined by detecting the output voltages of the first and second output parts 21 and 31. Therefore, it is possible to obtain constant first and second output voltages. Furthermore, the input voltage is amplified, and the amplified input voltage may be evenly distributed to the first and second output parts 21 and 31.

An equation for a voltage transfer ratio of the input voltage being applied to the first and second output parts 21 and 31 may satisfy Equation 3 as follows.

$$G_v = \frac{V_{01} + V_{02}}{V_i} = \frac{1}{1-D} \qquad \text{[Equation 3]}$$

At this time, by varying the duty ratio D within the range of zero to 1, the output voltages of the first and second output parts 21 and 31 may be controlled.

As described above, according to the power supply device 1000 of the present invention, by amplifying the input voltage, the amplified input voltage is distributed and applied to the first and second output parts 21 and 31. Thus, voltage stress on circuit elements is reduced. Therefore, an IGBT element as well as an FET element may be used as the switching element.

That is, a limitation in selecting a component element to be employed in the present invention is alleviated so that it is possible to increase design possibilities in order to avoid the size and cost increments of various elements.

In addition to the effect of lowering voltage stress on the various elements, since an output part is divided into two parts and driven, the two parts may provide power to circuits having functions different from each other. As such, the power supply device 1000 according to the embodiment of the present invention has an advantage in that it may provide a plurality of power supply sources by using one power supply source, and, based on that advantage, a size of the entire circuit and the manufacturing cost thereof may be reduced.

According to the aforementioned description, it has been described that the first and second switching elements Qs and Qm are simultaneously turned on and off, but they are not limited thereto.

According to a product with which the power supply device 1000 is employed, there may be a need for two output parts which have voltages different from each other. Thus, in this case, each of the first and second switching elements Qs and Qm may be independently driven. That is, by separately supplying a PWM signal to the first and second switching elements Qs and Qm, the first and second switching elements Qs and Qm may be independently controlled. Therefore, each of the first and second output parts 21 and 31 may output a different voltage.

(Third Operational Mode)

Figure 6:
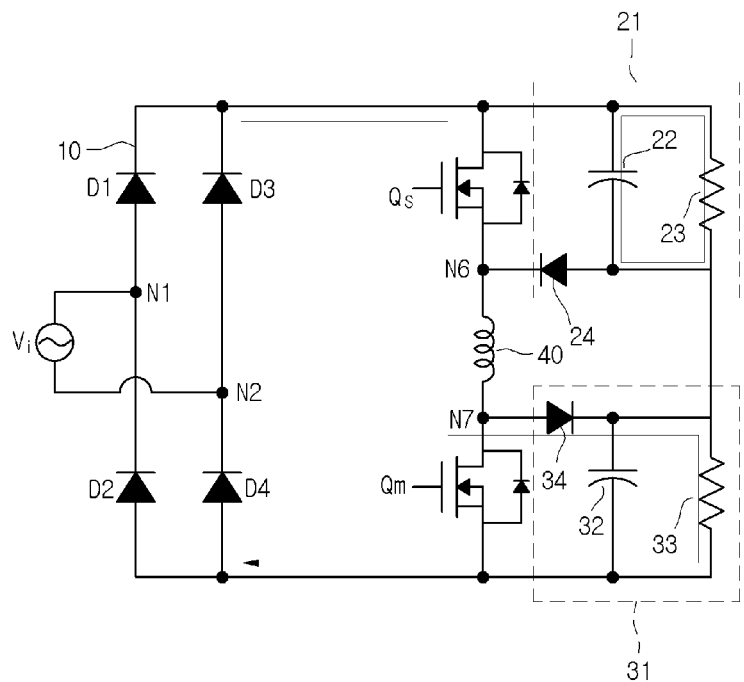
FIG. 6 is a diagram illustrating an operation manner when the first switching element Qs of the power supply device according to the first embodiment of the present invention is turned on and the second switching element Qm thereof is turned off.

FIG. 6 is a diagram illustrating an operation manner when the first switching element Qs of the power supply device 1000 according to the first embodiment of the present invention is turned on, and the second switching element Qm thereof is turned off.

With reference to FIG. 6, according to the third operational mode, the first switching element Qs may be turned on, and, simultaneously, the second switching element Qm may be turned off.

When the first switching element Qs is turned on and the second switching element Qm is turned off, a voltage applied to the first switching element Qs becomes zero volts and the current flowing therein becomes a current that flows in the inductor 40. Additionally, the input voltage is amplified and then applied to the second switching element Qm, and a current flowing therein becomes zero A. Additionally, a differential voltage between the input voltage and the voltage applied to the second switching element Qm is applied to the inductor 40, and the differential voltage becomes a negative voltage so that the current flowing in the inductor 40 is decreased.

(Fourth Operation Mode)

Figure 7:
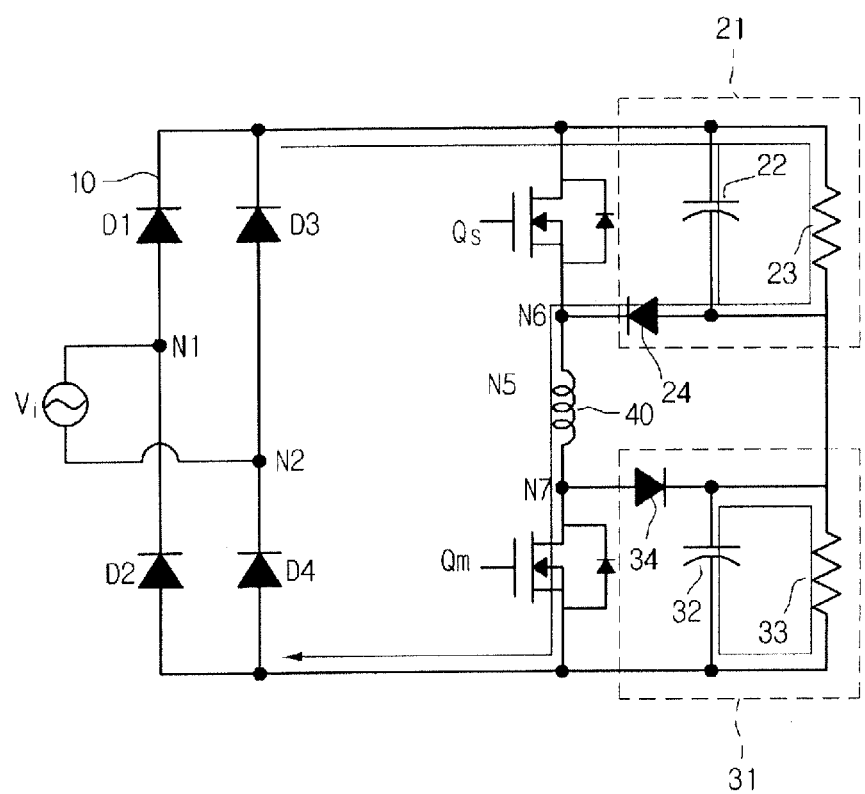

FIG. 7 is a diagram illustrating an operation manner when the first switching element Qs of the power supply device 1000 according to the first embodiment of the present invention is turned off, and the second switching element Qm thereof is turned on.

With reference to FIG. 7, according to the fourth operational mode, the first switching element Qs may be turned off, and, simultaneously, the second switching element Qm may be turned on.

When the first switching element Qs is turned off and the second switching element Qm is turned on, the input voltage is amplified and then applied to the first switching element Qs and the current flowing therein becomes zero A. Additionally, a voltage applied to the second switching element Qm becomes zero volts, and the current flowing therein becomes a current that flows in the inductor 40. Additionally, a differential voltage between the input voltage and the voltage applied to the first switching element Qs is applied to the inductor 40, and the differential voltage becomes a negative voltage so that the current flowing in the inductor 40 is decreased.

In the third and fourth operational modes described above, an amplification degree of the voltage applied to each of the first and second output parts 21 and 31 may be controlled depending on the duty ratio.

In conclusion, the power supply device 1000 according to the first embodiment of the present invention may operate in various manners depending on a combination of the first to fourth operational modes. For example, when the first and second operational modes are adopted as a main operational mode, the amplified voltage is distributed to the first and second output parts 21 and 31 so that voltage stress on a semiconductor device may be decreased, and the output voltages from the first and second output parts 21 and 31 may be used for the same or different purposes. Additionally, when the output voltages from the first and second output parts 21 and 31 are intermittently different from each other, the purpose of decreasing voltage stress by varying the duty ratio of the PWM signal applied to each of the first and second switching elements Qs and Qm may be realized. Additionally, when the first and second operational modes are adopted as the main operational mode, the amplified voltages having the same value as each other may be applied to the first and second output parts 21 and 31. However, due to the non-ideal characteristics of circuit elements and/or external factors, the amplified voltages having the same amplitude as each other at the first and second output parts 21 and 31 may not be sustained. In this case, by additionally employing the third and fourth operational modes, the amplified voltages having the same amplitude may be sustained at the first and second output parts 21 and 31.

Hereinafter, a power supply device 3000 according to a second embodiment of the present invention will be described.

However, the second embodiment of the present invention will be referred to as a balanced output power supply device 3000.

According to the power supply device 1000 of the first embodiment described above, it is possible to divide and provide the input voltage to the two output parts, and to evenly distribute the input voltage through the first to fourth operational modes, thereby applying the distributed input voltages to the two output parts.

Conversely, it is possible to operate in a manner in which the amplified input voltage is distributed differently to the two output parts. Additionally, the amplified input voltage may be evenly distributed to the two output parts for a predetermined time period, and the amplified input voltage may be distributed at different values to the two output parts within a specified time period.

In the second embodiment, it will be described that the balanced output power supply device 1000 evenly distributes the input voltage to provide the distributed input voltages to output parts of two stages, and corrects a voltage imbalance when the voltage imbalance occurs at the output parts of two stages.

When the power supply device 1000 described in the first embodiment operates alternately in the first and second operational modes, the amount of currents flowing on loads of the first and second output parts 21 and 31 may be different from each other. In this case, energy charging in a capacitor of one of the two output parts on which the large amount of current flows may be relatively lower than that charging in the other capacitor of the remaining output part. Therefore, an output voltage of the remaining output part, which includes the other capacitor being charged with the relatively low energy, may be lowered. In this case, an even distribution of the input voltage may not be realized and a balanced output may not occur. Additionally, as a relatively high voltage is applied to one of semiconductor devices in a circuit, voltage stress on the semiconductor device to which the relatively high voltage is applied may be increased.

According to the second embodiment of the present invention, when a different current flows in each of the first and second output parts 21 and 31 and causes an imbalance of output voltages, the imbalance may be remedied.

Hereinafter, an operation manner of a balanced output power supply device 3000 according to the second embodiment of the present invention will be described with reference the accompanying drawings.

Figure 8:
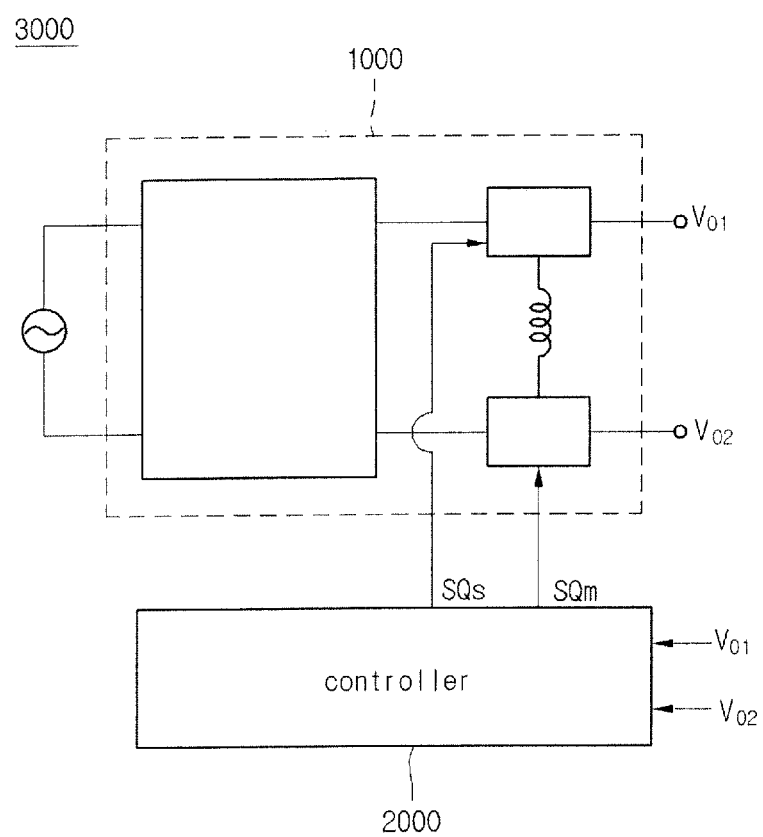
FIG. 8 is a diagram illustrating a balanced output power supply device according to a second embodiment of the present invention.
Figure 9:
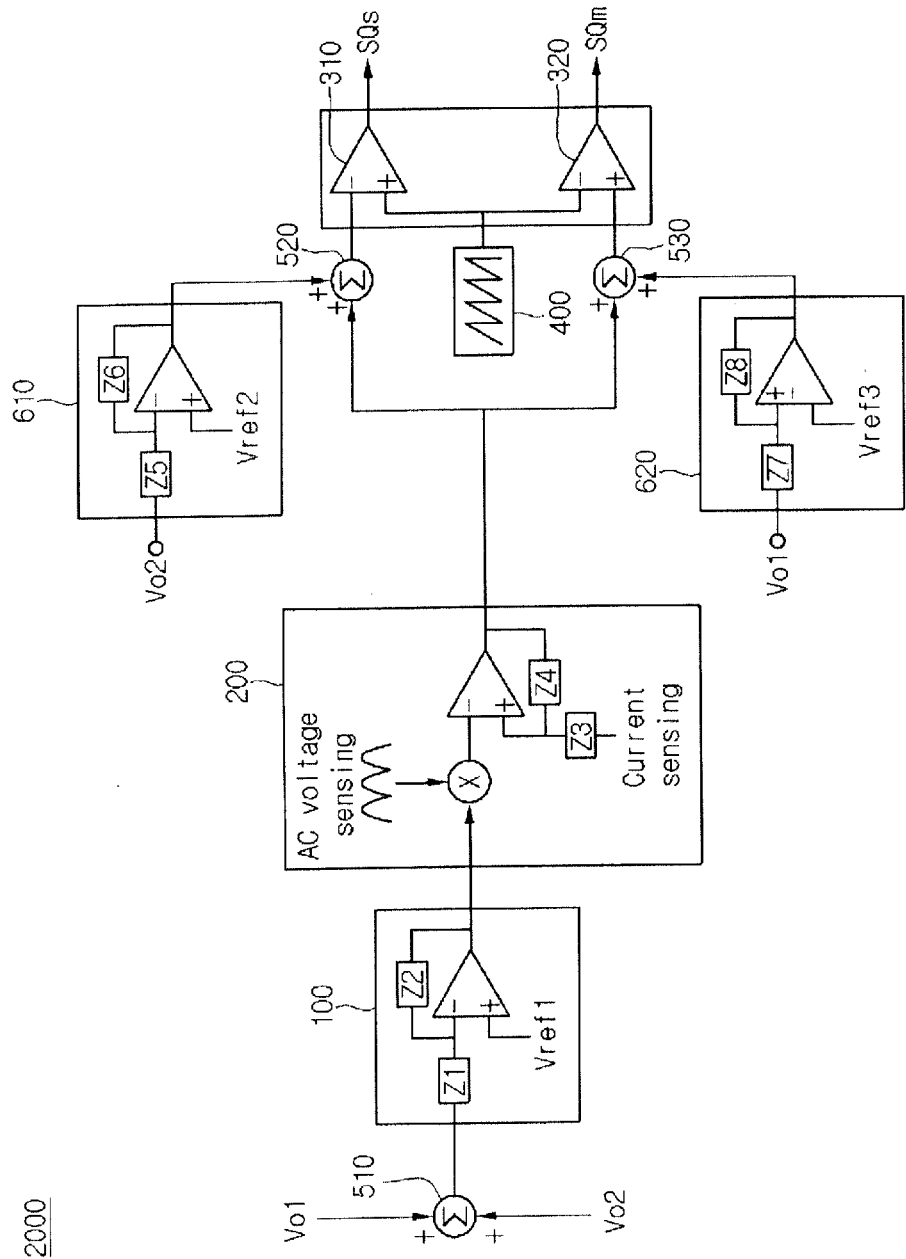
FIG. 9 is a diagram illustrating a control unit of the balanced output power supply device according to the second embodiment of the present invention.

FIG. 8 is a diagram illustrating the balanced output power supply device 3000 according to the second embodiment of the present invention, and FIG. 9 is a circuit diagram illustrating a detailed configuration of a control unit shown in FIG. 8.

With reference to FIGS. 8 and 9, the balanced output power supply device 3000 may include a power supply unit 1000 and a controller 2000.

The power supply unit 1000 may be the power supply device 1000 described in FIGS. 2 to 7, and the controller 2000 generates a control signal for turning the switching elements Qs and Qm of the power supply device 1000 on or off.

With reference to FIGS. 8 and 9, the balanced output power supply device 3000 according to the second embodiment of the present invention may include a voltage controller 100, a power factor correction circuit 200, a triangle wave generation circuit 400, a first comparator 310, a second comparator 320, a first micro-displacement controller 610, and a second micro-displacement controller 620. Additionally, the balanced output power supply device 3000 may further include first to third adders 510, 520, and 530.

Considering a connection relationship of each element constituting the controller 2000, the first adder 510 may be connected among terminals to which the first and second output voltages $V_{o1}$ and $V_{o2}$ are applied and an input terminal of the voltage controller 100.

The voltage controller 100 may be connected among a first reference voltage terminal $V_{ref1}$, an output terminal of the first adder 510, and an input terminal of the power factor correction circuit 200.

The power factor correction circuit 200 may be connected among an output terminal of the voltage controller 100, a terminal to which an AC voltage sensing signal is applied, a terminal to which a current sensing signal is applied, and input terminals of the second and third adders 520 and 530. Additionally, the second adder 520 may be connected between an output terminal of the first micro-displacement controller 610 and an input terminal of the first comparator 310, the third adder 530 may be connected between an output terminal of the second micro-displacement controller 620 and an input terminal of the second comparator 320, the first micro-displacement controller 610 may be connected between a terminal to which the second output voltage $V_{o2}$ is applied and a terminal to which a second reference voltage $V_{ref2}$ is applied, and the second micro-displacement controller 620 may be connected between a terminal to which the first output voltage $V_{o1}$ is applied and a terminal to which a third reference voltage $V_{ref3}$ is applied, thereby outputting a signal to the third adder 530.

Moreover, the first comparator 310 may be connected among an output signal terminal of the triangle wave generation circuit 400, an output signal terminal of the second adder 520, and a control terminal of the first switching element Qs. The second comparator 320 may be connected among the output signal terminal of the triangle wave generation circuit 400, an output signal terminal of the third adder 530, and a control terminal of the second switching element Qm.

Hereinafter, an operation manner of the balanced output power supply device 3000 according to the second embodiment of the present invention will be described. In this case, as an example, it will be assumed that the peak of an input AC voltage is 400 volts and each of the first and second output parts 21 and 31 outputs 400 volts by amplifying the input AC voltage by two times. It should be noted that the numerical values described herein are proposed for convenience of explanation and they are not limited thereto.

The voltage controller 100 receives a sum signal of output voltages from the first and second output parts 21 and 31 and compares the sum signal with the first reference voltage $V_{ref1}$.

That is, the voltage controller 100 may be configured with an operational amplifier that amplifies a difference between the first reference voltage $V_{ref1}$ applied to a noninverting terminal and the output voltages of the first and second output parts 21 and 31 applied to an inverting terminal, thereby outputting a first control signal.

The first reference voltage $V_{ref1}$ may be 800 volts, which is the peak, i.e. 400 volts, of the input AC voltage amplified by two times. The voltage controller 100 may compare the first reference voltage $V_{ref1}$ with the sum signal of the output voltages of the first and second output parts 21 and 31 and amplify a difference derived from the comparison result, thereby outputting the first control signal corresponding to the amplified difference to the power factor correction circuit 200.

Meanwhile, the output voltages of the first and second output parts 21 and 31 may be the sum signal by the first adder 510.

The power factor correction circuit 200 may receive the first control signal output from the voltage controller 100, a sensed input voltage $V_i$, and a sensed output current to output a second control signal.

That is, the power factor correction circuit 200 may be configured with an operational amplifier that amplifies a difference among the sensing input voltage signal and the first control signal, which are applied to the noninverting terminal, and the sensing current signal applied to the inverting terminal, thereby outputting the second control signal.

The sensed output current may be defined as the current flowing in the inductor 40. Otherwise, the sensed output current may be an average current flowing in the inductor 40, and the current flowing in the first switching element Qs or the second switching element Qm.

The first micro-displacement controller 610 may compare the output voltage of the first output part 21 with the second reference voltage $V_{ref2}$ to output a first micro-displacement signal, and the second micro-displacement controller 620 may compare the output signal of the second output part 31 with the third reference voltage $V_{ref3}$ to output a second micro-displacement signal.

Meanwhile, the first micro-displacement controller 610 may be configured with an operational amplifier that receives the output of the second output part through a noninverting terminal and the second reference voltage $V_{ref2}$ through an inverting terminal, and amplifies a difference between the received output and the second reference voltage $V_{ref2}$ to output the first micro-displacement signal. Additionally, the second micro-displacement controller 620 may be configured with an operational amplifier that receives the output of the first output part through a noninverting terminal and the third reference voltage $V_{ref3}$ through an inverting terminal, and amplifies a difference between the received output and the third reference voltage $V_{ref3}$ to output the second micro-displacement signal.

The second and third reference voltages $V_{ref2}$ and $V_{ref3}$ may have the same value as each other.

Meanwhile, when the input voltage is amplified and then the amplified input voltage is evenly applied to the first and second output parts 21 and 31, a voltage at each of the first and second output parts 21 and 31 may be 400 volts and 400 volts may be made as the second and third reference voltages $V_{ref2}$ and $V_{ref3}$.

The second control signal output from the power factor correction circuit 200 and the first micro-displacement signal may be converted into a first comparison signal, which is a sum signal, by the second adder 520 to be provided to the first comparator 310. The second control signal output from the power factor correction circuit 200 and the second micro-displacement signal may be converted into a second comparison signal, which is a sum signal, by the third adder 530 to be provided to the second comparator 320.

The first and second comparators 310 and 320 serve as a circuit that compares an analog signal with a reference signal to output a binary signal to be used in an analog signal to digital signal conversion process. Additionally, the first and second comparators 310 and 320 have properties much like that of a general-purpose operational amplifier having high gain.

The first comparator 310 may compare the triangle wave signal output from the triangle wave generation circuit 400 with the first comparison signal and provide a first PWM signal to the first switching element Qs, thereby controlling ON/OFF operations thereof. The second comparator 320 may compare the triangle wave signal output from the triangle wave generation circuit 400 with the second comparison signal and provide a second PWM signal to the second switching element Qm, thereby controlling ON/OFF operations thereof.

Specifically, the noninverting terminal of the operational amplifier of the first comparator 310 may receive the first micro-displacement signal and the second control signal, and the inverting terminal thereof may receive the triangle wave signal, so that the first comparator 310 compares the received signals to output the first PWM signal. The non-inverting terminal of the operational amplifier of the second comparator 320 may receive the second micro-displacement signal and the second control signal, and the inverting terminal thereof may receive the triangle wave signal, so that the second comparator 320 compares the received signals to output the second PWM signal.

The first and second PWM signals may be a signal for adjusting ON/OFF time of each of the first and second switching elements. That is, by adjusting duty ratios of the first and second PWM signals in the range of, i.e. 1% to 100%, linear control may be realized.

Meanwhile, the triangle wave signal generated in the triangle wave generation circuit 400 may be allocated to have an appropriate period and a magnitude depending on the second control signal and the first and second micro-displacement signals in order to adjust the duty ratio of pulse width modulation.

Meanwhile, first to eighth impedances Z1 to Z8 included in the voltage controller 100, the power factor correction circuit 200, the first micro-displacement controller 610, and the second micro-displacement controller 620, which are shown in FIG. 9, may be pure resistance elements and pure capacitance elements. Specifically, the first, third, fifth, and seventh impedances Z1, Z3, Z5, and Z7 may be resistors, whereas since the second, fourth, sixth, and eighth impedances Z2, Z4, Z6, and Z8 serve as negative feedback of the operational amplifier, they may be configured with a resistor and a capacitor serially connected thereto.

With reference to FIGS. 4 to 7, an operation manner for adjusting an unbalanced output to a balanced output will be described.

For example, it will be considered that the amplifier 50 amplifies an input voltage from the input power supply 11 by n times (n is a positive real number).

The first amplification unit 20 included in the amplifier 50 outputs the first output voltage $V_{o1}$ corresponding to n1 times (n1 is a positive real number) the input voltage, and the second amplification unit 30 outputs the second output voltage $V_{o2}$ corresponding to n2 times (n2 is a positive real number) the input voltage.

At this time, when an output voltage of the second output part 31 included in the second amplification unit 30 is decreased to make n1 greater than n2, i.e. to set the relationship of n1>n2, by increasing an ON time of the first switching element Qs, that is, by delaying turn-off time of the first switching element Qs than that of the second switching element Qm, the output voltages of the first and second output parts 21 and 31 may be adjusted to make a balanced output voltage.

That is, as shown in FIGS. 4 and 5, when the power supply device 1000 operates alternately in the first and second operational modes, due to the non-ideal characteristics of internal elements in the circuit and external factors causing the decrease of the output voltage of the second output part 31, the output voltages of the first and second output parts 21 and 31 may be adjusted by temporarily changing to the third operational mode shown in FIG. 6.

Hereinafter, when the output voltages of the first and second output parts 21 and 31 are uneven, an operation manner of the controller will be considered.

For example, when the output voltage of the second output part 31 is decreased, a voltage applied to an inverting terminal of the first micro-displacement controller 610 is decreased. Then, the voltage of the first micro-displacement signal, that is the output voltage of the first micro-displacement controller 610, may be increased to be output as a high signal. Further, when the output voltage of the second output part 31 is decreased, the output voltage of the first output part 21 is increased and a voltage applied to an inverting terminal of the second micro-displacement controller 620 is increased. Therefore, the second micro-displacement signal, that is the output voltage of the second micro-displacement controller 620, may be increased to become a low signal.

As such, the first micro-displacement signal of which the voltage is increased and the second micro-displacement signal of which the voltage is decreased may be converted into the first and second comparison signals, respectively, which are the sum signals added to the second control signal, to be applied to the first and second comparators 310 and 320.

The first and second comparators 310 and 320 to which the first and second comparison signals are applied may compare the triangle wave signal with the applied comparison signals to generate and output PWM output signals of which pulse widths are modulated.

Specifically, due to the first micro-displacement signal that is the high signal, a magnitude of a signal applied to the inverting terminal of the first comparator 310 is increased so that a duty ratio of the first PWM output signal may be increased. Due to the second micro-displacement signal that is the low signal, a magnitude of a signal applied to the inverting terminal of the second comparator 320 is decreased so that a duty ratio of the second PWM output signal may be decreased.

As such, due to the first PWM output signal of which the duty ratio is increased, a turn-on time of the first switching element Qs may be prolonged and a turn-on time of the second switching element Qm may be shortened. That is, while turn-on time points of the first and second switching elements Qs and Qm are the same time point, turn-off time points are time points different from each other and the balance of voltages of the first and second output parts 21 and 31 may be controlled.

Meanwhile, when the first and second comparison signals are applied to the inverting terminal and the triangle wave signal is applied to the noninverting terminal by reversing the signals applied to the first and second comparators 310 and 320, since the first and second comparators 310 and 320 perform reversal operations with respect to the operations described above, the first comparator 310 may generate the first PWM output signal of which a duty ratio is decreased, and the second comparator 320 may generate the second PWM output signal of which a duty ratio is increased.

Moreover, when bandwidths of the voltage controller 100, the power factor correction circuit 200, and the first and second micro-displacement controllers 610 and 620 are set, it is preferable to set the largest bandwidth to the power factor correction circuit 200 and the second-largest bandwidth to the voltage controller 100.

While the controller 2000 of the balanced output power supply device 3000 according to the second embodiment of the present invention is described as a digital controller, alternatively, it may be realized by using an analog power factor controller integrated circuit (PFC IC).

Figure 10:
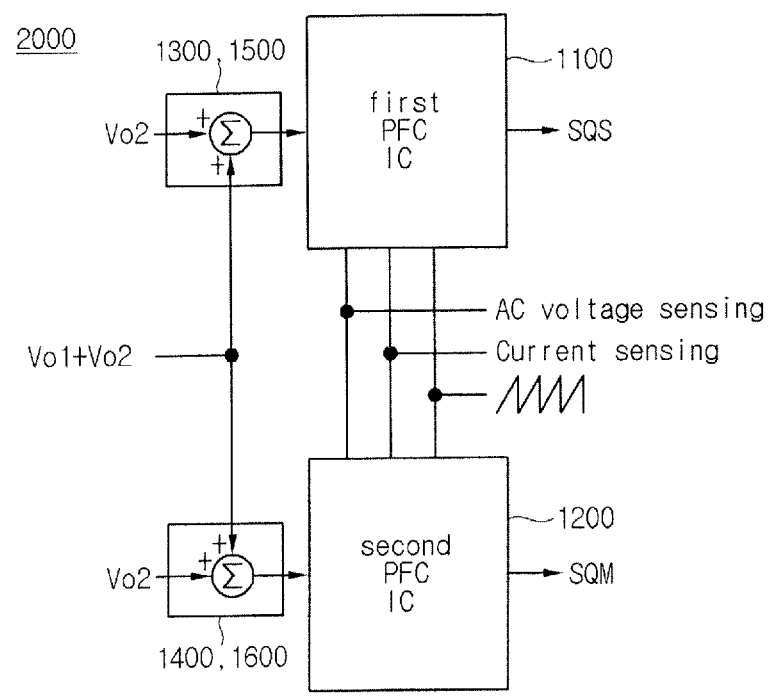
FIG. 10 is a diagram illustrating an analog control unit of the balanced output power supply device according to the second embodiment of the present invention.

FIG. 10 is a diagram illustrating an analog controller 2000 of the balanced output power supply device 3000 according to the second embodiment of the present invention.

With reference to FIG. 10, the analog controller 2000 of the balanced output power supply device 3000 according to the second embodiment of the present invention may include first and second PFC ICs 1100 and 1200, and first and second adders 1300 and 1400.

The first and second PFC ICs 1100 and 1200 may receive the sensed AC input voltage, the sensed current, and the triangle wave signal, and receive feedback signals from the first and second adders 1300 and 1400, respectively, thereby outputting first and second PWM signals for controlling the first and second switching elements Qs and Qm.

The first adder 1300 may add the output voltage of the second output part 31 to the input voltages of the first and second output parts 21 and 31 to output the added voltage to the PFC IC 1100. Additionally, the second adder 1400 may add the output voltage of the first output part 21 to the input voltages of the first and second output parts 21 and 31 to output the added voltage to the second PFC IC 1200.

Instead of the first and second adders 1300 and 1400, first and second dual feedback units 1500 and 1600 may be implemented by using elements of series 431 capable of feeding back the output voltages.

Figure 11:
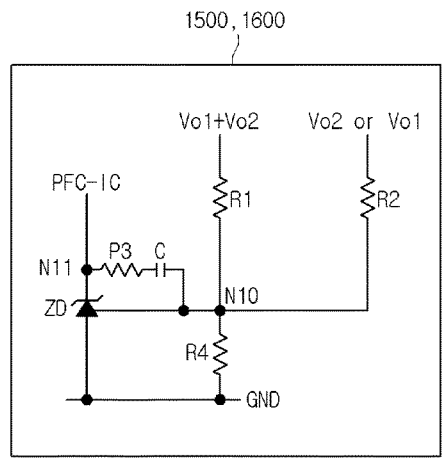
FIG. 11 is a circuit diagram of first and second dual feedback units.

FIG. 11 is a circuit diagram of the first and second dual feedback units 1500 and 1600.

With reference to FIG. 11, a detailed circuit configuration of the first and second dual feedback units 1500 and 1600 will be considered.

Since a circuit configuration regarding one of the first and second dual feedback units 1500 and 1600 having an output voltage feedback structure may be identical to that of the remaining dual feedback unit, the first dual feedback unit 1500 will be mainly described.

The first dual feedback unit 1500 may include first to fourth resistors R1 to R4, a capacitor C, and a Zener diode ZD.

The resistor R1 is connected between a tenth node N10 and a terminal to which the output voltages of the first and second output parts 21 and 31 are applied.

The resistor R2 is connected between the tenth node N10 and a terminal to which the output voltage of the second output part 31 is applied.

The third resistor R3 and the capacitor C, which are connected to each other in series, are connected between the tenth node N10 and an eleventh node N11.

The Zener diode ZD is connected between the tenth node N10, the eleventh node N11, and a ground GND. A feedback output to the first PFC IC 1100 is applied to the eleventh node N11.

By selecting resistance of the first resistor R1 smaller than that of the second resistor R2, a weighted value may be imposed.

Figure 12:
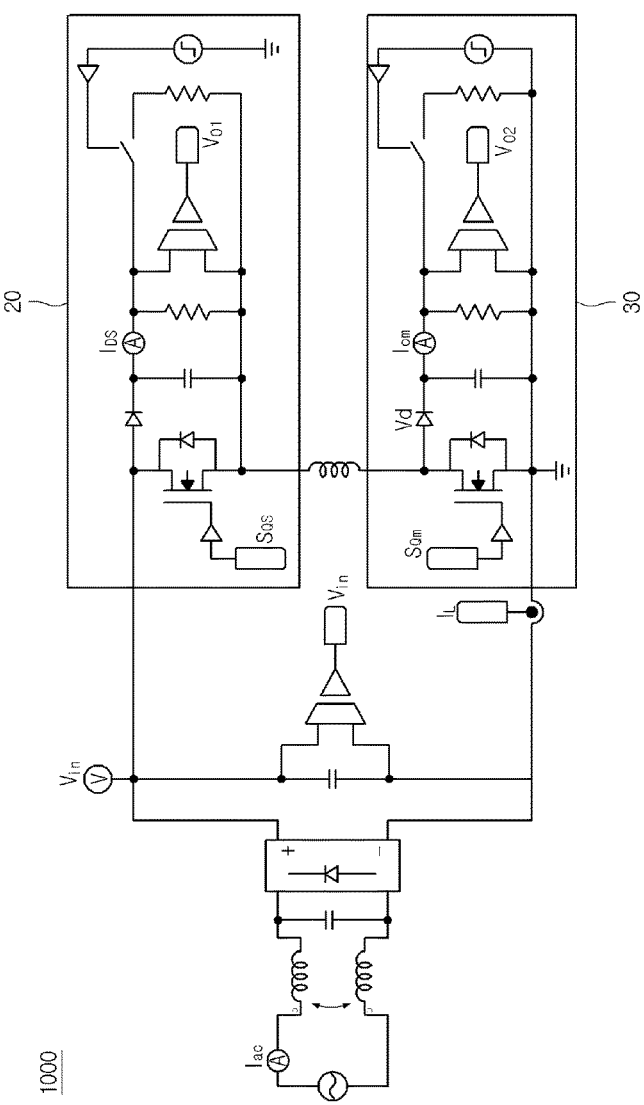
FIGS. 12 and 13 are circuit diagrams of a power supply device according to an embodiment of the present invention and a control unit for operating the power supply device.
Figure 13:
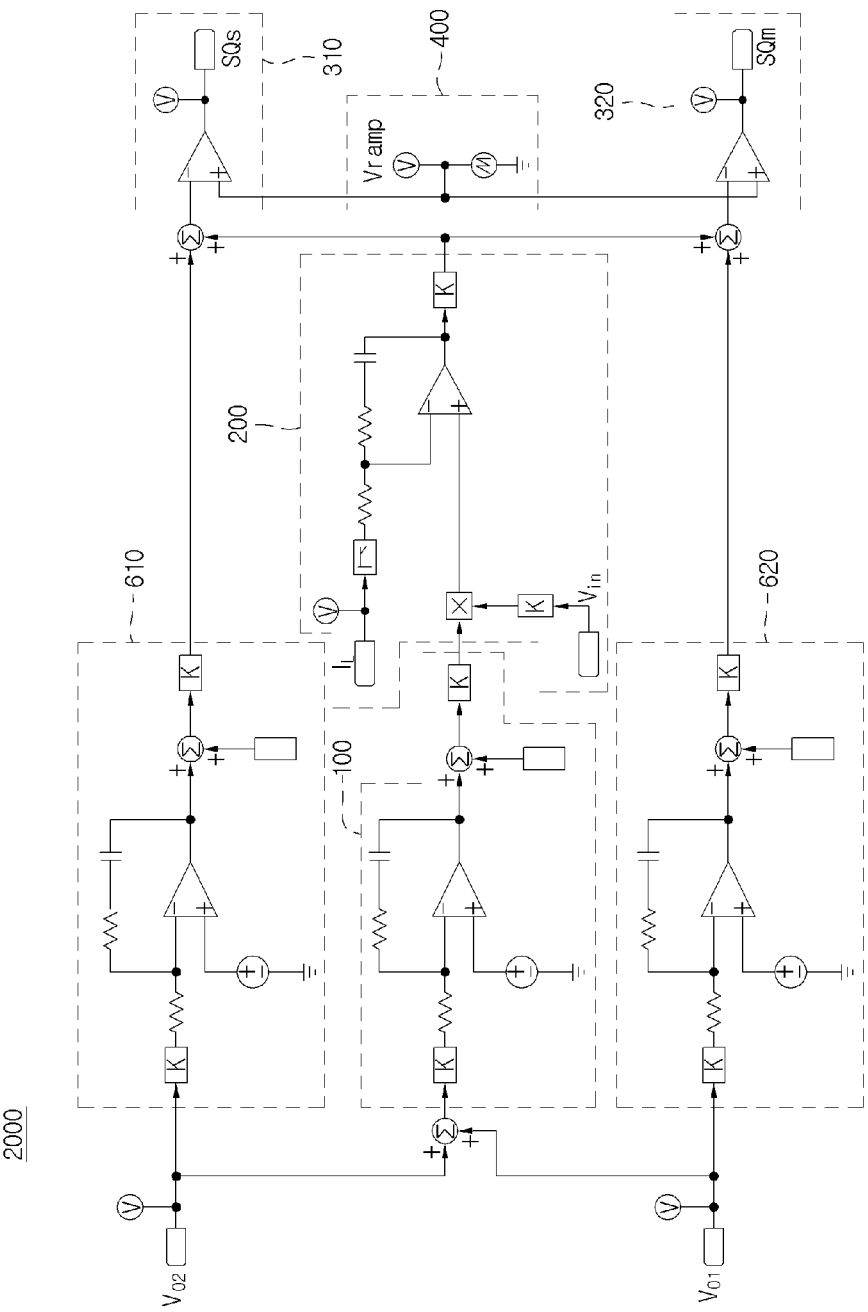

FIGS. 12 and 13 are circuit diagrams for simulating the balanced output power supply device 3000 according to the second embodiment of the present invention.

Figure 14:
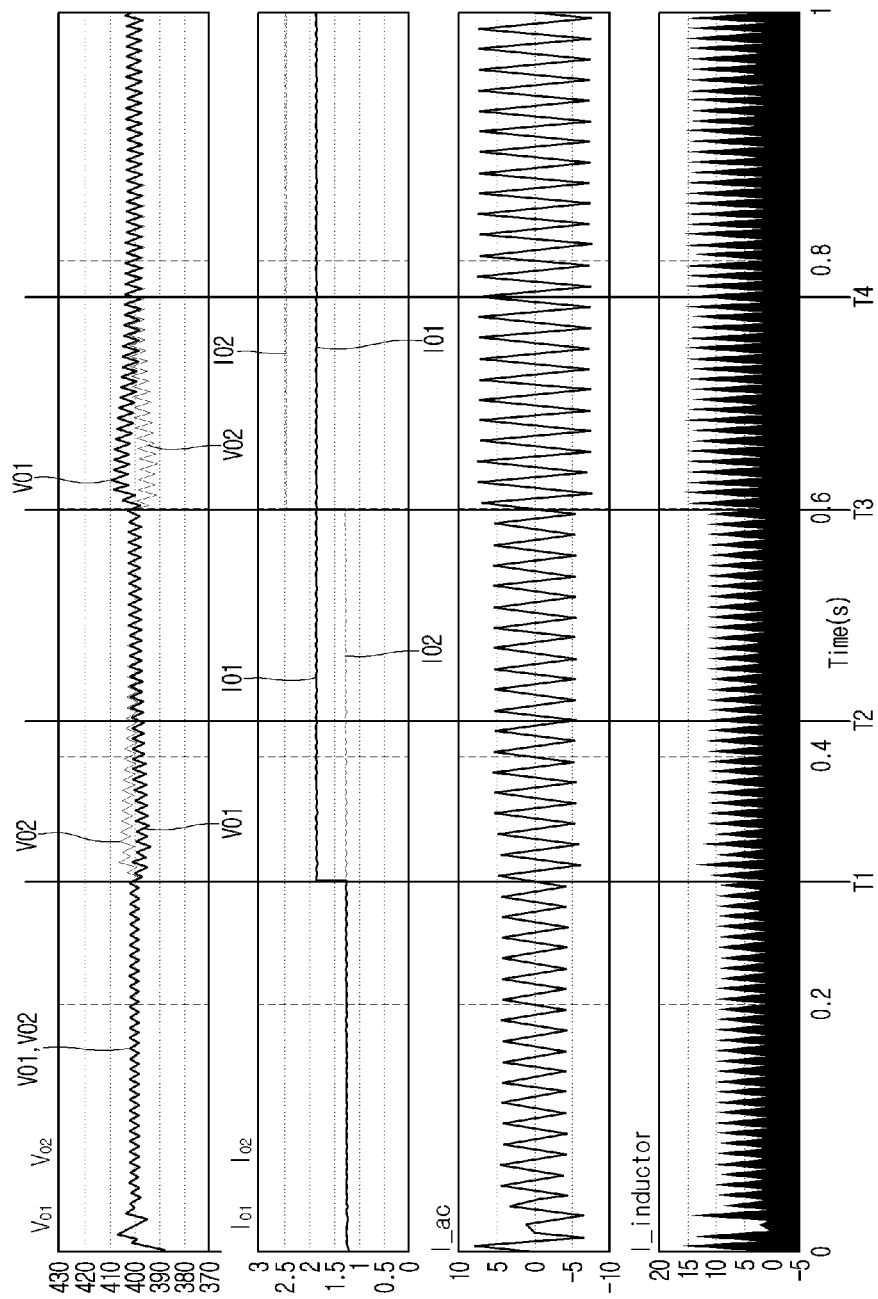
FIG. 14 is a diagram illustrating a simulation result of the power supply device according to the embodiment of the present invention.

With reference to FIG. 14 illustrating a simulation result of the balanced output power supply device 3000 shown in FIGS. 12 and 13, an operation manner and effect of the balanced output power supply device according to the second embodiment of the present invention will be described.

With reference to FIG. 14, when a current flowing on the first output part 21 is increased at a time point T1 so that currents flowing in the first and second output parts 21 and 31 are uneven, it can be seen that the voltage $V_{o2}$ of the second output part 31 is increased and the voltage $V_{o1}$ of the first output part 21 is decreased. In this case, it can be seen that the first micro-displacement signal of a high signal is output from the first micro-displacement controller 610, and thus a magnitude of a signal applied to the inverting terminal of the first comparator 310 is increased so that a duty ratio of the first PWM output signal may be increased, and, due to the second micro-displacement signal of a low signal from the second micro-displacement controller 620, a magnitude of a signal applied to the inverting terminal of the second comparator 320 is decreased, and thus a duty ratio of the second PWM output signal is decreased so that the output voltages $V_{o1}$ and $V_{o2}$ of the first and second output parts 21 and 31 are equalized to each other after a time point T2.

Contrarily, when a current flowing on the second output part 31 is increased at a time point T3 so that currents flowing in the first and second output parts 21 and 31 are uneven, it can be seen that the voltage $V_{o1}$ of the first output part 21 is increased and the voltage $V_{o2}$ of the second output part 31 is decreased. In this case, it can be seen from the graph that the first micro-displacement signal of a low signal is output from the first micro-displacement controller 610, and thus a magnitude of a signal applied to the inverting terminal of the first comparator 310 is decreased so that the duty ratio of the first PWM output signal may be reduced, and, due to the second micro-displacement signal of a high signal from the second micro-displacement controller 620, a magnitude of a signal applied to the inverting signal of the second comparator 320 is increased, and thus the duty ratio of the second PWM output signal is increased so that the output voltages $V_{o1}$ and $V_{o2}$ of the first and second output parts 21 and 31 become approximately even with each other after a time point T4.

As described above, the balanced output power supply device 1000 according to the present invention has an advantage in that, when the output voltages of the first and second output parts 21 and 31 are not equal to each other, according to the operations of the first and second micro-displacement controller 610 and 620 and the first and second comparators 310 and 320, the duty ratios of the first and second PWM signals are adjusted so that the output voltages of the first and second output parts 21 and 31 may be evenly adjusted.

While the foregoing invention has been described with reference to the above-described embodiments, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This detailed description, therefore, is not to be taken in a limiting sense, and the scope of various embodiments is defined only by the appended claims, along with the full range of equivalents to which such claims are entitled.

What is claimed is:

1. A power supply device, comprising:
    an input power supply unit configured to rectify alternating-current (AC) power;
    an amplification unit configured to amplify an input voltage by n times, where n is a real number greater than 1; and
    a controller controlling the amplification unit;
    wherein the amplification unit includes first and second amplification units and an inductor, the first amplification unit outputs a first output voltage corresponding to n1 times the input voltage to a first output part depending on an operation of a first switching element, where n1 is a positive real number, and the second amplification unit outputs a second output voltage corresponding to n2 times the input voltage to a second output part depending on an operation of a second switching element, where n2 is a positive real number;
    wherein the first amplification unit includes the first output part connected to the first switching element in parallel, and the second amplification unit includes the second output part connected to the second switching element in parallel;
    wherein the first amplification unit, the second amplification unit, and the inductor are serially connected;
    wherein the controller includes first and second power factor correction integrated circuits (PFC ICs), and first and second adders;
    wherein the first adder adds the output voltage of the second output part to the input voltages of the first and second output parts to output a first feedback signal to the first PFC IC;
    wherein the second adder adds the output voltage of the first output part to the input voltages of the first and second output parts to output a second feedback signal to the second PFC IC;
    wherein the first PFC IC receives the first feedback signal, the input voltage, an output current, and a triangle wave signal, and outputs a first pulse width modulation (PWM) signal for controlling the first switching element; and
    wherein the second PFC IC receives the second feedback signal, the input voltage, the output current, and the triangle wave signal, and outputs a second PWM signal for controlling the second switching element.

2. The power supply device of claim 1, wherein the inductor is connected between the first amplification unit and the second amplification unit,
    wherein the first adder includes first to fourth resistors, a third capacitor, and a first Zener diode; and
    wherein the second adder includes fifth to eighth resistors, a fourth capacitor, and a second Zener diode.

3. The power supply device of claim 2, wherein the first switching element is an IGBT element,
    wherein the second switching element is an insulated gate bipolar transistor (IGBT) element,
    wherein the first resistor is connected between a first node and a terminal to which the output voltages of the first and second output parts are applied,
    wherein the second resistor is connected between the first node and a terminal to which the output voltage of the second output part is applied,
    wherein the third resistor and the third capacitor, which are connected to each other in series, are connected between the first node and a second node;
    wherein the first Zener diode is connected between the first node, the second node, and a ground;
    wherein the first feedback signal is outputted from the second node,
    wherein the fourth resistor is connected between the first node and the ground,
    wherein the fifth resistor is connected between a third node and the terminal to which the output voltages of the first and second output parts are applied,
    wherein the sixth resistor is connected between the third node and a terminal to which the output voltage of the first output part is applied,
    wherein the seventh resistor and the fourth capacitor, which are connected to each other in series, are connected between the third node and a fourth node;
    wherein the second Zener diode is connected between the third node, the fourth node, and the ground;
    wherein the second feedback signal is outputted from the fourth node, and
    wherein the eighth resistor is connected between the third node and the ground.

4. The power supply device of claim 3, wherein the input power supply unit includes a rectifier, and the rectifier is a bridge rectifier;
    wherein a resistance of the first resistor is smaller than a resistance of the second resistor, and
    wherein a resistance of the fifth resistor is smaller than a resistance of the sixth resistor.

5. The power supply device of claim 1, wherein the first and second switching elements serve to control a current supplied from the inductor to the first and second output parts, and
    wherein the output current is defined as a current flowing in the inductor.

6. The power supply device of claim 1, wherein the first output part includes a first diode and a first capacitor-resistor unit which are connected to each other in series, and the second output part includes a second diode and a second capacitor-resistor unit which are connected to each other in series.

7. The power supply device of claim 6, wherein a capacitor and a resistor included in each of the first and second capacitor-resistor units are connected to each other in parallel.

8. The power supply device of claim 1, wherein n, n1, and n2 satisfy Equation 1:

$$n=n1+n2. \quad \text{[Equation 1]}$$

9. The power supply device of claim 1, wherein n1 and n2 have the same value as each other.

10. The power supply device of claim 1, wherein the first and second switching elements are simultaneously turned on and simultaneously turned off.

11. The power supply device of claim 1, wherein the first and second switching elements are simultaneously turned on, the first switching element is turned off at a first time point, and the second switching element is turned off at a second time point,
wherein the first time point arrives later than the second time point when n1 has a value greater than that of n2.

12. A power supply device, comprising:
a rectifier configured to rectify AC power to a first voltage;
an amplification unit configured to receive and boost the first voltage from the rectifier and divide the boosted voltage to output the divided voltage as second and third voltages; and
a controller controlling the amplification unit;
wherein the amplification unit includes:
a first amplification unit configured to receive and amplify the first voltage to output the second voltage;
a second amplification unit serially connected to the first amplification unit, and configured to receive and amplify the first voltage to output the third voltage; and
an inductor serially connected to the first and second amplification units;
wherein the first amplification unit includes a first output part connected to a first switching element in parallel, and the second amplification unit includes a second output part connected to a second switching element in parallel;
wherein the first output part outputs the second voltage;
wherein the second output part outputs the third voltage;
wherein the controller includes first and second PFC ICs, and first and second adders;
wherein the first adder adds the third voltage to the second and third voltages to output a first feedback signal to the first PFC IC;
wherein the second adder adds the second voltage to the second and third voltages to output a second feedback signal to the second PFC IC;
wherein the first PFC IC receives the first feedback signal, the first voltage, an output current, and a triangle wave signal, and outputs a first PWM signal for controlling the first switching element; and
wherein the second PFC IC receives the second feedback signal, the first voltage, the output current, and the triangle wave signal, and outputs a second PWM signal for controlling the second switching element.

13. The power supply device of claim 12, wherein the first output part includes a first capacitor, a first output resistor, and a first output diode;
wherein the second output part includes a second capacitor, a second output resistor, and a second output diode;
wherein the first adder includes first to fourth resistors, a third capacitor, and a first Zener diode; and
wherein the second adder includes fifth to eight resistors, a fourth capacitor, and a second Zener diode.

14. The power supply device of claim 13, wherein the inductor is connected between the first and second amplification units,
wherein the first resistor is connected between a first node and a terminal to which the second and third voltages are applied,
wherein the second resistor is connected between the first node and a terminal to which the third voltage is applied,
wherein the third resistor and the third capacitor, which are connected to each other in series, are connected between the first node and a second node;
wherein the first Zener diode is connected between the first node, the second node, and a ground;
wherein the first feedback signal is outputted from the second node,
wherein the fourth resistor is connected between the first node and the ground,
wherein the fifth resistor is connected between a third node and the terminal to which the second and third voltages are applied,
wherein the sixth resistor is connected between the third node and a terminal to which the second voltage is applied,
wherein the seventh resistor and the fourth capacitor, which are connected to each other in series, are connected between the third node and a fourth node;
wherein the second Zener diode is connected between the third node, the fourth node, and the ground;
wherein the second feedback signal is outputted from the fourth node, and
wherein the eighth resistor is connected between the third node and the ground.

15. The power supply device of claim 14, wherein the second and third voltages are controlled depending on operating frequencies of the first and second switching elements,
wherein a resistance of the first resistor is smaller than a resistance of the second resistor, and
wherein a resistance of the fifth resistor is smaller than a resistance of the sixth resistor.

16. The power supply device of claim 15, wherein the first and second switching elements are simultaneously turned on and turned off.

17. The power supply device of claim 15, wherein the first and second switching elements are simultaneously turned on and turned off when the second and third voltages are the same as each other.

18. The power supply device of claim 15, wherein ON/OFF ratios of the first and second switching elements are determined by detecting the output voltages of the first and second output parts,
wherein the first and second switching elements are simultaneously turned on and simultaneously turned off during a first period in which the second and third voltages are the same as each other, and
the first switching element is turned off at a first time point and the second switching element is turned off at a second time point during a second period in which the second and third voltages are different from each other.

19. The power supply device of claim 18, wherein the first and second switching elements are simultaneously turned on during the second period.

20. The power supply device of claim 13, wherein the second and third voltages are the same voltage as each other, and wherein the output current is defined as a current flowing in the inductor.

\* \* \* \* \*